United States Patent [19]

Utke

[11] Patent Number: 5,306,885
[45] Date of Patent: Apr. 26, 1994

[54] CABLE ATTACHING DEVICE

[75] Inventor: Gene Utke, Rochert, Minn.

[73] Assignee: S. J. Electro Systems, Inc., Detroit Lakes, Minn.

[21] Appl. No.: 942,641

[22] Filed: Sep. 9, 1992

[51] Int. Cl.⁵ .............................................. H01L 3/02
[52] U.S. Cl. ................................. 200/338; 200/84 R; 24/136 R; 24/115 M
[58] Field of Search ..................... 200/61.2, 79, 84 R, 200/84 A, 329, 331, 337, 338; 4/394; 417/40, 41; 24/136 R, 115 M; 73/290 R, 318

[56] References Cited

U.S. PATENT DOCUMENTS

| | | | |
|---|---|---|---|
| 2,474,498 | 6/1949 | Schwabe | 24/136 R |
| 3,504,145 | 3/1970 | Layher | 200/84 R |
| 3,951,505 | 4/1976 | Williams | 43/44.91 |
| 4,330,906 | 5/1982 | Werner | 439/451 |
| 4,416,036 | 11/1983 | Aho | 24/136 R |
| 4,615,532 | 6/1986 | Billes et al. | 24/115 M X |
| 4,719,671 | 1/1988 | Ito et al. | 160/178.1 |
| 4,858,810 | 8/1989 | Intlekofer et al. | 24/115 M X |
| 4,967,824 | 11/1990 | Colson et al. | 24/115 R |
| 5,137,517 | 8/1992 | Loney et al. | 24/115 M X |
| 5,159,861 | 11/1992 | Anderson | 24/115 M X |

FOREIGN PATENT DOCUMENTS 3601174 7/1987 Fed. Rep. of Germany .
24287 of 1913 United Kingdom .

Primary Examiner—Glenn J. Barrett
Attorney, Agent, or Firm—Vidas, Arrett & Steinkraus

[57] ABSTRACT

The invention provides a clamping device which removably secures a body to a cable, the clamping device comprising a toothed, tapered cable gripping insert which fits into a stepped, tapered recess slot in the body. The cable gripping insert is retained in position by a T-shaped latching bar on the top of the insert which fits into transverse grooves in the body on either side of the recess slot. A clamped cable exits the recess slot at right angles to its entry, providing pivoting action. The cable attaching device is particularly suited for use with an attachment for use with a float switch assembly. Such an attachment may be used as a weighted pivot for a float switch or alternatively as an unweighted float for extending the range of an existing float switch assembly.

18 Claims, 3 Drawing Sheets

U.S. Patent     Apr. 26, 1994     Sheet 1 of 3     5,306,885
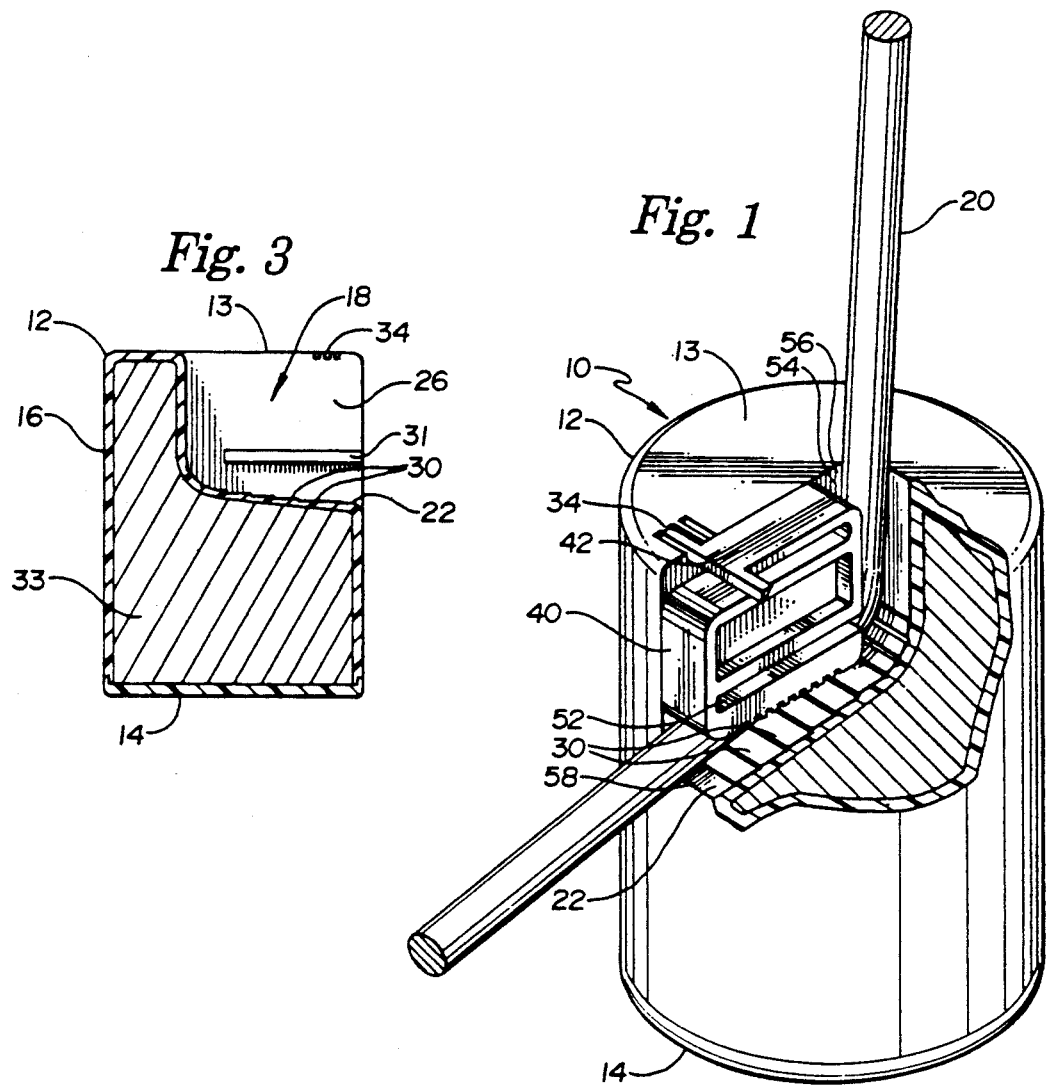
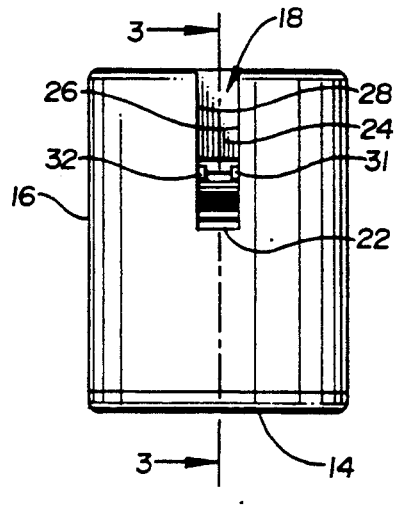

CABLE ATTACHING DEVICE

BACKGROUND OF THE INVENTION

I. Field of the Invention

This invention relates to the general art of cable attaching devices and more particularly to a cable clamp for use with an attachment intended for use with a float switch assembly, the attachment providing in one embodiment a weighted pivot and in another embodiment, an additional float to extend the range of the float switch assembly to which it is attached.

II. Description of the Related Art

Cable clamps exist wherein the cable is held by a toothed tapered wedge. For instance, U.S. Pat. No. 4,330,906 issued to Werner on May 25, 1992 relates to a feed-through connection which connects an electric power transmission cable to a transmission tower. The connection has a serrated wedge which clamps the cable. The wedge is positioned by pins and driven into the body of the connection by hammering or a propellant power tool, to immovably fix the cable into the connection. Further, the connection is designed to prevent the cable from making sharp bends, the channel being curved at a 65 degree angle.

British patent 24,287 issued to Witham et al on Oct. 23, 1913 relates to an end fastening device for ropes in which the rope exits the clamp at 90 degrees from the entrance.

U.S. Pat. No. 2,474,498 issued to Schwabe on Jun. 28, 1949 discloses a fishing float with a vertical slot in which a fishing line is held by a key. The key is held by a spring brass annular ring.

U.S. Pat. No. 3,951,504 issued to Williams on Apr. 20, 1976 discloses an electric cable stress transfer device with a collar and wedge with ratchet teeth which permit forward movement of the wedge into the collar and limit rearward movement of the wedge out of the collar. The teeth do not contact the electric cable.

U.S. Pat. No. 4,416,036 issued to Aho on Nov. 22, 1983 discloses a fastening means for a wrist strap of a ski pole which includes a toothed wedge.

U.S. Pat. No. 4,719,671 issued to Ito et al. on Jan. 19, 1988 discloses a strap connector which includes a core with grooves which is inserted in a connector body, said grooves exerting a pinching force on two pieces of strap, thereby holding them in the connector.

U.S. Pat. No. 4,967,824 issued to Colson et al. on Nov. 6, 1990 discloses a cord equalizer for gripping two or more cords of a shade which includes a molded insert member which is permanently wedged into a body member. The molded insert member has a single ridge which urges the cords against the inner surface of the body member, thereby compressing the cords and holding them in the body member.

There still exists a need for a simple trustworthy clamp for attaching a body to a cable. Particularly in the art of float switches, there is a need for a simple trustworthy clamp for an attachment which removably secures the attachment to a cable. The present invention provides a toothed, tapered cable gripping insert which is constructed and arranged to fit into a stepped, tapered recess slot in an attachment. A clamp cable exits the recess slot at right angles to its entry, providing pivoting action to a float switch assembly, allowing the float switch assembly to adapt to changing water levels. The cable gripping insert is retained in position by a T-shaped latching bar on the top of the attachment.

External weight assemblies in the art require that the cable be threaded through the weight and thus become an integral part of the assembly. The present invention provides an independent component that may be attached to the cable of a float switch assembly when weighting or alternatively, extension of the range of the float, is a requirement. Further, most weights are composed of cast iron or lead and are therefore unsuitable for use in potable water absent the use of special sealants. The present invention, however, provides an attachment which is sealed and is therefore suitable for use in potable water.

Operation with a sump pump requires equipment that will assure certainty of operation over long periods of time. This invention also fulfills a need for an improved weight attachment for use with a current float switch assembly, which, when weighted, is heavy enough to prevent the float switch assembly from rising in the fluid. The weight attachment is removable, which simplifies adjustment of the position of the attachment on the cable. In its most preferred form it also provides a pivot for a float switch assembly to adapt to changing water levels, thereby assuring a longer operating life, greater reliability and less wear and tear on parts of the switch assembly. An alternative embodiment provides an unweighted float attachment to extend the range of the float switch assembly.

SUMMARY OF THE INVENTION

The invention is directed to a clamp for an attachment which removably secures the attachment to a cable. The present invention provides a toothed, tapered cable gripping insert which is constructed and arranged to fit into a stepped, tapered recess slot in an attachment. A clamped cable exits the recess slot at right angles to its entry, providing pivoting action to a float switch assembly, allowing the float switch assembly to adapt to changing water levels. The cable gripping insert is retained in position by a T-shaped latching bar on the top of the attachment.

One embodiment of the invention is directed to an attachment for use with a cable attached to a float switch, the attachment comprising a molded cylindrical housing with a stepped, tapered recessed slot for receiving a cable and a removable toothed, tapered cable gripping means. The gripping means has at least one pair of oppositely disposed channels which are slidably engaged with oppositely disposed ribs formed on the walls of the recessed slot, said ribs being located one to either side of the recessed slot. The cable gripping means is shaped to mate with the ribs slot and has a T-shaped latch bar located on its upper edge which fits into the transverse grooves near the recessed slot, whereby the attachment may be removably fixed to the cable, the cable being held in the recessed slot between the rows of steps on the floor of the recessed slot and the teeth on the lower edge of the gripping means by placing the cable in the recessed slot and inserting the cable gripping means into place. The gripping means is retained in position by the T-shaped latching bar and the ribs on the walls of the recessed slot. In addition, the device holds the cable so that it exits the recessed slot at a right angle to its entry, thereby providing a pivot means for the float switch assembly to respond to changes in water level without the necessity of a fixed pivot. The attachment further includes a weighting substance or ballast disposed in the housing.

In an alternative embodiment, the attachment may also be manufactured without the weighting substance, thereby providing an attachable float for extending the range of an existing float switch assembly.

BRIEF DESCRIPTION OF THE DRAWINGS

The features of the present invention which are believed to be novel are set forth with particularity in the appended claims. The invention, together with further objects and advantages thereof, may be best understood by reference to the following description taken in conjunction with the accompanying drawings, wherein like reference numerals identify like elements, throughout and in which:

FIG. 1 is a perspective view thereof with cutaway to show cable gripping assembly;

FIG. 2 is a front elevational view thereof with cable gripping means removed;

FIG. 3 is a sectional view thereof along line 5—5;

DETAILED DESCRIPTION OF THE PREFERRED EMBODIMENTS

Figure 4:
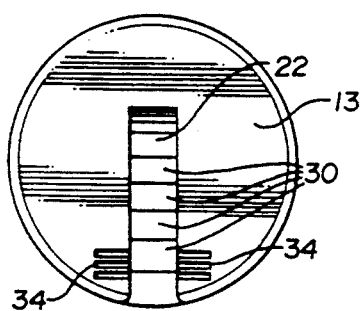
FIG. 4 is a top plan view thereof with cable gripping means removed.
Figure 5:
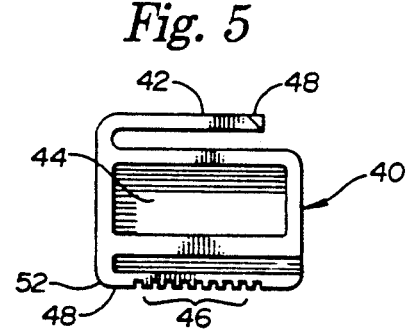
FIG. 5 is a right side elevational view of the cable gripping means.
Figure 6:
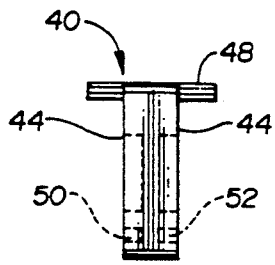
FIG. 6 is a rear elevational view thereof of the cable gripping means.
Figure 7:
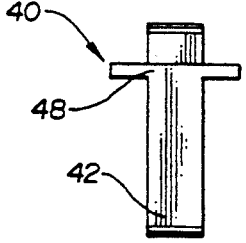
FIG. 7 is a top plan view of the cable gripping means.

Referring to FIGS. 1-7, a cable attaching device is shown. The cable attaching device, generally indicated at 10, comprises a molded cylindrical housing 12 having a flat top 13, a flat bottom 14, a cylindrical wall 16, and as is best shown in FIGS. 2 and 3, a tapered recessed slot 18 formed at top 13 and side wall 16 of housing 12 for receiving a cable 20 as shown in FIG. 1. As shown in FIGS. 2 and 3, recessed slot 18 has a floor 22, a back wall 24, two side walls 26 and 28 and a row of steps 30 located on floor 22 of recessed slot 18. In the most preferred embodiment, Floor 22 is constructed to slant at a 5° angle with respect to the horizontal. Horizontal ribs 31 and 32 are located at side walls 26 and 28 of recessed slot 18.

A weighting means may be located in the interior 33 of housing 12. The cable attaching device in its most preferred embodiment is associated with an attachment for use with a float switch assembly, although the cable attaching device may be used with any body to which a cable is attached.

Weighting means 33 is located within the housing. Alternatively, the device may be manufactured without a weighting substance, to be used as an attachable float to provide range extensions for existing float switches. At least one pair of transverse grooves 34 is located at the outer edge of top 13 of housing 12, one to either side of the recessed slot 18. As shown in FIG. 4, the most preferred embodiment has three pairs of transverse grooves 34 to allow the device to grip differing cable sizes.

As shown in FIG. 1 and FIGS. 5 through 7, removable cable gripping means 40 comprises a tapered body having an upper edge 42, a lower edge 43 and sides 44. A row of teeth 46 is located on lower edge 43. a T-shaped latching bar 48 is located on upper edge 42. Gripping means 40 is shaped to mate with recessed slot 18 and is retained therein by lateral channels 50 and 52 located in sides 44 near lower edge 43, which slidably engage with ribs 31 and 32, in addition to T-shaped latching bar 48, which fits into transverse grooves 34 on top 13 of housing 12. When gripping means 40 is in place, a channel 54 for cable 20 is formed in recessed slot 18 with an inlet 56 and an outlet 58.

Attachment 10 may be removably fixed to cable 20, the cable being held in cable channel 54 between steps 30 on floor 22 of recessed slot 18 and row of teeth 46 on lower edge 43 of gripping means 40. Cable 20 is placed in recessed slot 18 and cable gripping means 40 is inserted into place. Cable 20 is held so that it exits outlet 58 of recessed slot 18 at a right angle to its entry, at inlet 56.

Attachment 10 will fit any cable, 18-2 through 12-2 or other combinations such as 16-3 and the like. Further, steps 30, and teeth 46 securely hold cable 20, preventing it from slipping. Inlet 56 and outlet 58 are smooth and rounded to prevent wear or chafing of cable 20. The outer jacket of cable 20 will not be pinched or distorted. Additional pairs of transverse grooves 34 allow cable gripping means 40 to be adjusted to the size of the cable.

The weighting means may be composed of any suitable weighting material, and is held in interior 33 of housing 12. In its preferred embodiment, the weighting substance is a mixture of sand and steel balls housed in PVC or polypropylene. While most weights are composed of cast iron or lead and are therefore unsuitable for use in potable water absent the use of special sealants, the present invention provides a weight attachment suitable for use in potable water. In addition, the device may be manufactured without a weighting substance, to be used as an attachable float to provide range extensions for existing float switch assemblies.

Figure 8:
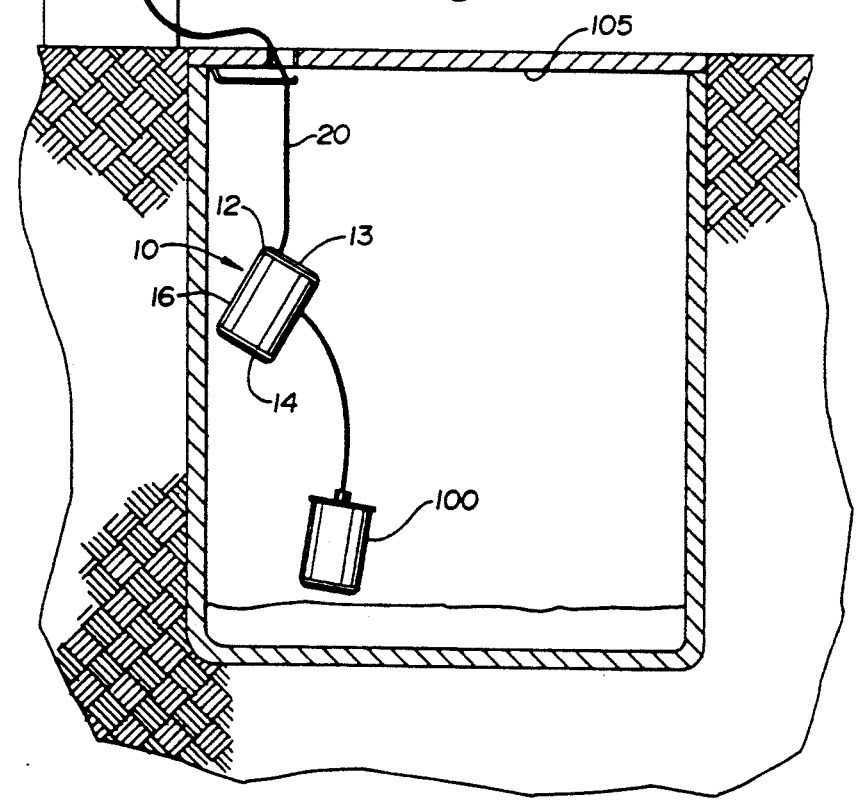
FIG. 8 is a right side plan view of a float switch weight attachment according to the invention.
Figure 9:
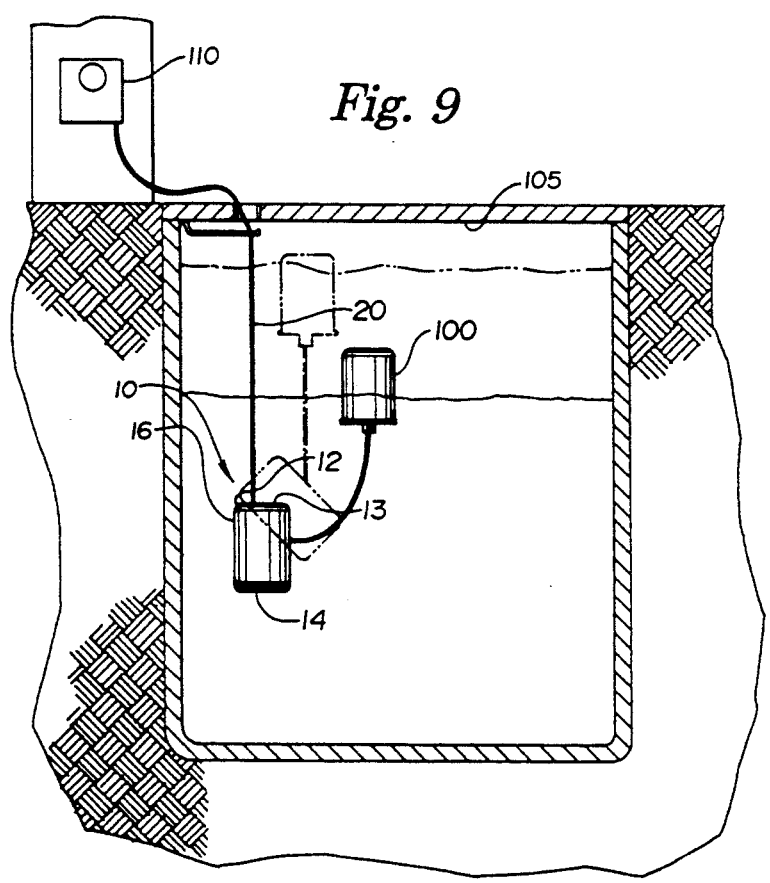
FIG. 9 is a right side plan view of the float switch attachment with phantom lines to show the invention in use.

When weighted, the attachment serves to maintain the position of the float switch assembly in a tank, as shown in FIGS. 8 and 9, as well as to provide a pivot for the float switch. This embodiment is most suited to use with a positionally sensitive float switch that does not directly control a pump, but is connected to a control panel and serves a monitoring function. The control panel may control a pump or a warning device.

In operation, as shown in FIGS. 8 and 9, a float switch weight attachment hangs straight on cable 20, positioning the cable from cable outlet 58 of slot 18 in a horizontal position, and allows the float switch assembly 100 to pivot in response to rising and falling liquid levels. FIG. 9 shows the float switch assembly pivoting on the attachment in response to a rising water level in tank 105. The cable shown extends upward and may either be connected to control panel or box 110, or alternatively to an electrical outlet.

Figure 10:
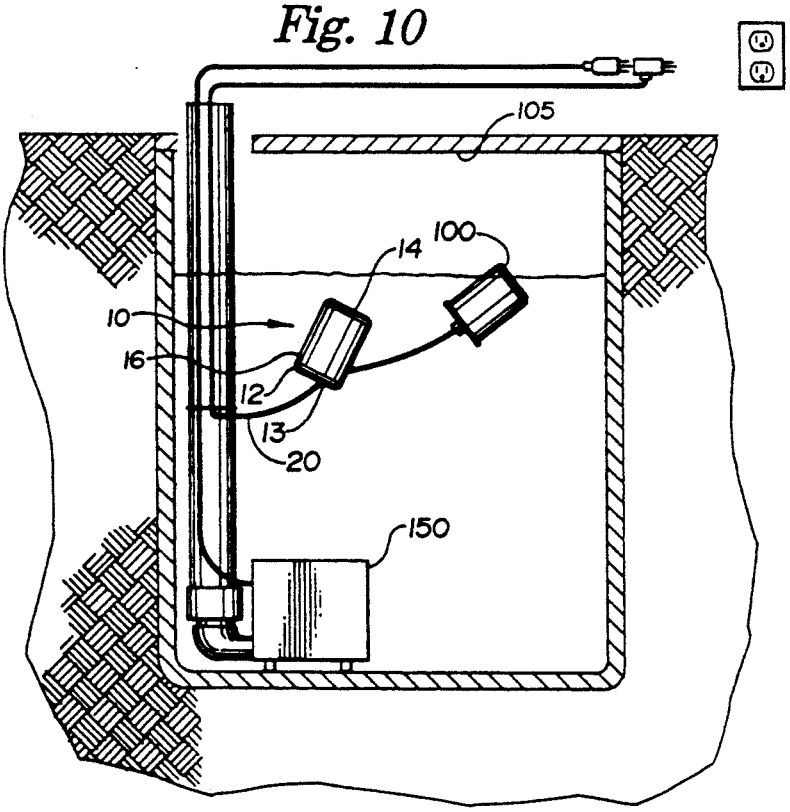
FIG. 10 is a right side plan view of an alternative embodiment of the float switch attachment in use as a float extension.

As shown in FIG. 10, the attachment may alternatively be used as a float extension for use with a float switch directly connected to a pump 150. The attachment adds buoyancy to a float switch assembly, thereby extending the range of water at which the float switch operates. In this embodiment, the float switch directly controls the pump.

Both embodiments operate with positionally sensitive float switches, including normally open (N.O.) and normally closed (N.C.) switches. A N.O. switch is activated in response to a rise in water level. When the level of water causes the float switch to reach a position of about 45° above horizontal, the switch is activated. A N.O. switch switches off when the float switch descends to a position about 45° below horizontal, in response to a decrease in water level. A N.C. switch is activated at about 45° below horizontal and switches off at about 45° above horizontal. N.O. or N.C. switches may be mercury activated or mechanically activated.

A unique feature of the invention is the manner in which the cable gripping means is assembled. T-bar 48 of gripping means 40, and the combination of ribs 31 and 32 and channels 50 and 52, provide a simple means of attachment of gripping means 40 to housing 12 which is strong and dependable, yet reversible. Other external assemblies in the art require that the cable be threaded through the weight and thus become an integral part of the assembly. Although the cable attaching device of the present invention is shown in association with an attachment for use with a float switch assembly, the cable attaching device may be constructed and arranged to attach a cable to any body.

The present invention further provides an independent component that is attached when weighting is a requirement, or alternatively, when additional range for the float switch assembly is required. The assembly may be added to products that use weighting devices or other attachments attached to cable without modifications to existing products. Further, the attachment of the present invention is universal and may be used with any float switch.

The attachment of the present invention may be easily installed with no tools, and is securely attached to a cable. The cable attaching device may be easily removed for adjustment of the position of an attachment cable, or for reuse. The cable attaching device can be attached to any 18-2 through 12-2 cable or other combinations such as 16/3 cable, due to the 5° angle in the step area.

The attachment in its preferred form may be made of molded plastic such as PVC or polyethylene. The attachment therefore appears to be an engineered part of the original float switch assembly. The attachment may be produced in different colors. Additionally, the attachment is suited for use in water, as no metal parts are exposed, and there are no metal parts such as screws and the like to rust. The attachment is also inexpensive to make. Although generally made of PVC, it may be made of polypropylene for use in higher temperature environments. Further, the weighted attachment may be reduced in size with additional cast iron ballast.

This completes the description of the preferred and alternate embodiments of the invention. Those skilled in the art may recognize other equivalents to the specific embodiment described herein which equivalents are intended to be encompassed by the claims attached hereto.

What is claimed is:

1. A cable clamping device for connecting a body to a cable, the clamping device comprising
   a main body with a top, a bottom and at least one side wall,
   a tapered recessed slot formed in said body for receiving a cable, said recessed slot having a floor, a back wall, two opposing side walls, each wall including a rib and a plurality of steps located on the floor of said recessed slot;
   at least one pair of transverse grooves located on the top of the main body, one to either side of the recessed slot;
   a snap-fit removable cable gripping means comprising a tapered body having an upper edge, a lower edge and two opposite sides, said sides including a pair of lateral channels, one channel located on each side, and a row of teeth located on said lower edge, said gripping means being shaped to mate with the said ribs and being retained therein by a T-shaped latching bar located on the upper edge of the cable gripping means, said T-shaped latching bar being constructed and arranged to fit into the transverse grooves on top of the main body and the lateral channels which slidably engage with the ribs located on the walls of said recessed slot;
   whereby a cable may be removably fixed to the body, the cable being held in the recessed slot between the steps on the floor of the recessed slot and the teeth on the lower edge of the gripping means by placing the cable in the recessed slot and inserting the cable gripping means into place.

2. The cable clamping device of claim 1 constructed and arranged for use with a positionally sensitive switch.

3. A float switch attachment comprising:
   a main body having a top, a bottom and at least one side wall defining an interior, said main body having a tapered recessed slot for receiving a cable, the slot being formed in the top and side wall of the main body, said slot defining a floor, a back wall disposed toward the interior of the main body, two opposing side walls, each of said opposing side walls of said slot having a rib disposed thereon, said ribs extending toward the back wall of the slot, and a plurality of steps located on the floor of said recessed slot;
   at least one pair of transverse grooves located one to either side of the recessed slot; and
   a removable cable gripping means comprising a tapered body having an upper edge and a lower edge, front and back ends and two sides, further including a pair of lateral channels, one on each side, and a row of teeth located on said lower edge, and a transverse T-shaped latching bar located on said upper edge, said gripping means being shaped to mate with the said recessed slot and being retained therein by the T-shaped latching bar, which fits into the transverse grooves on top of the housing and the lateral channels which slidably engage with the ribs located on the sides of the recessed slot;
   whereby the float switch attachment may be removably fixed to a cable extending to the float switch, the cable being held in the recessed slot between the steps on the floor of the recessed slot and the teeth on the lower edge of the gripping means by placing the cable in the recessed slot and inserting the cable gripping means into place, and the cable is held so that it exits the recessed slot from the side at a right angle to its entry at the top.

4. The float switch attachment of claim 3 further including means for adding addition weight thereto, the main body being constructed and and arranged to encase the additional weight therein.

5. The float switch attachment of claim 4 wherein the means for adding additional weight is a mixture of sand and steel balls.

6. The float switch attachment of claim 3 constructed and arranged for buoyancy and to be removably attached to the cable of an existing float switch assembly to thereby provide increased buoyancy to the float switch assembly.

7. The float switch attachment of claim 3 wherein the main body is made of PVC.

8. The float switch attachment of claim 3 wherein the main body is made of polyethylene.

9. The float switch attachment of claim 3 wherein the main body comprises a molded cylindrical housing having a flat top, a flat bottom, a cylindrical side wall, and the tapered recessed slot is formed at the top and side wall of the housing.

10. The float switch attachment of claim 9 further including means for adding additional weight thereto, the main body being constructed and arranged to encase the additional weight therein.

11. The float switch attachment of claim 10 wherein the means for adding additional weight is a mixture of sand and steel balls.

12. The float switch attachment of claim 9 constructed and arranged for buoyancy and to be removably attached to the cable of an existing float switch assembly to thereby provide increased buoyancy to the float switch assembly.

13. The float switch attachment of claim 9 wherein the main body is made of PVC.

14. The float switch attachment of claim 9 wherein the main body is made of polyethylene.

15. A float switch attachment comprising:
   a molded cylindrical housing having a flat top with an outer edge, a flat bottom, a cylindrical wall, a tapered recessed slot formed at the top and side wall of the housing for receiving a cable, said recessed slot having a floor, a back wall, a pair of opposing side walls, each wall having a rib disposed thereon, and a plurality of steps located on the floor of said recessed slot;
   at least one pair of transverse grooves proximal to the the outer edge of the top of the housing, one to either side of the recessed slot; and
   a removable cable gripping means comprising a tapered body having an upper edge, a lower edge and two opposite sides, a row of teeth located on said lower edge, a T-shaped latching bar located on said upper edge, and a pair of channels located one on each side of said tapered body, said gripping means being shaped to mate with the recessed slot and being retained therein by the T-shaped latching bar, which fits into the transverse grooves on top of the housing and the lateral channels which slidably engage with the ribs located on the walls of the recessed slot;
   whereby the attachment may be removably fixed to the cable, the cable being held to the recessed slot between the steps on the floor of the recessed slot and the teeth on the lower edge of the gripping means by placing the cable in the recessed slot and inserting the cable gripping means into place, and the cable is held so that it exits the recessed slot at a right angle to its entry.

16. The float switch attachment of claim 15 further including means for adding additional weight thereto, the main body being constructed and arranged to encase the additional weight therein.

17. The float switch attachment of claim 16 wherein the means for adding additional weight is a mixture of sand and steel balls.

18. The float switch attachment of claim 15 constructed and arranged for buoyancy and to be removably attache to the cable of an existing float switch assembly to thereby provide increased buoyancy to the float switch assembly.

* * * * *